April 5, 1955     N. F. PRESCOTT     2,705,609

PLUG VALVE

Filed July 22, 1954

INVENTOR.
NORMAN F. PRESCOTT

BY *Kenway, Jenney, Witter & Hildreth*

ATTORNEYS

United States Patent Office 2,705,609
Patented Apr. 5, 1955

2,705,609

PLUG VALVE

Norman F. Prescott, Wenham, Mass., assignor to Atwood & Morrill Company, Salem, Mass., a corporation of Massachusetts Application July 22, 1954, Serial No. 445,110

6 Claims. (Cl. 251—162)

This invention relates to plug valves of the non-lubricated type, wherein the valve is unseated, rotated and reseated. Numerous mechanisms for accomplishing this mode of operation have been suggested, but they are subject to certain objections in that they involve relatively complicated and expensive operating parts, or where a relatively simple operating mechanism is employed, undue strains are imposed on the operating parts which ultimately cause a failure. In some cases two operating levers are employed, one for raising and lowering the valve and the other for rotating it, but such constructions are considered undesirable from a practical standpoint, as are also those constructions which involve a reverse movement of the operating handle in order to effect the reseating of the valve.

The principal objects of the present invention are to overcome the aforementioned deficiencies and to provide a rugged, reliable valve having a relatively few parts which may be economically manufactured and readily assembled.

Further objects relate to various features of construction and will be apparent from a consideration of the following description and the accompanying drawings, wherein.

Figure 1:
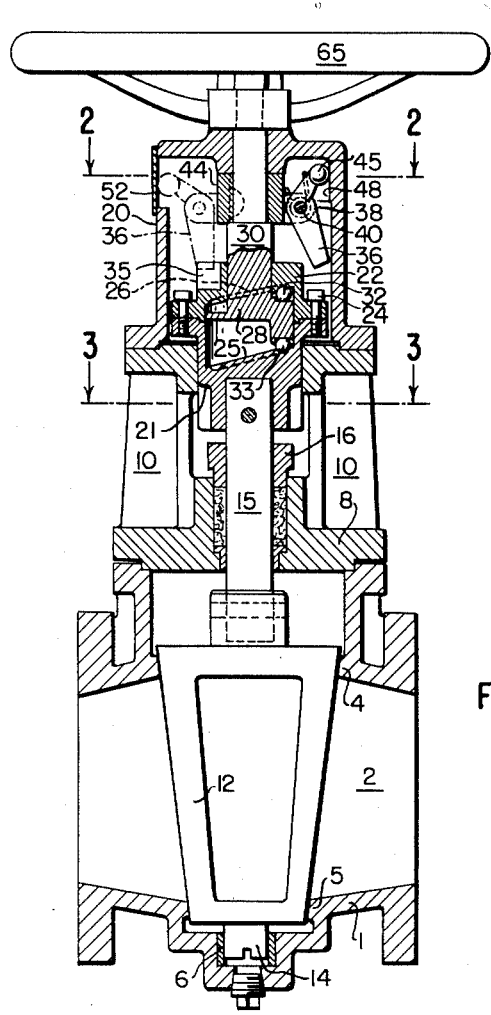
Fig. 1 is a vertical section through a plug valve constructed in accordance with the present invention.

The particular embodiment herein shown for the purpose of illustration comprises a valve body 1 formed with a passageway 2 and a frusto-conical shape cavity having valve seats 4 and 5 and a guide sleeve 6, all of which may be of conventional design and construction. A bonnet 8 covers the valve cavity and supports a yoke 10. A plug 12 is mounted within the valve cavity and its lower end carries a guide stem 14 which slidably fits the sleeve 6 and its upper end carries an operating stem 15 projecting upwardly through an opening in bonnet 8 which carries the usual packing gland 16, etc., to insure a fluid tight construction.

Mounted on the yoke 10 is the valve operating mechanism, the main parts of which are within the housing 20. This mechanism may comprise a two-part cam assembly 21 and 22, the lower part 21 being pinned or otherwise fixed to the upper part of the stem 15 and the upper part 22 being rigidly secured to the lower part 21 by screws 24 or other suitable means. The two parts are formed with spaced, vertically aligned cam surfaces 25 and 26 similar to the so-called diagonal disk cam, and interposed between these surfaces is a cam member 28 secured to or integral with the lower end of a spindle 30 which is rotatably mounted at the upper part of the housing 20.

The cam surfaces 25 and 26 are formed with circumferential grooves which receive ball bearing elements 32 and 33 associated with cam member 28, and the construction and arrangement of parts are such that when the spindle 30 is rotated in one direction or the other, the cam member 28 acts through ball bearings 32 and cam surface 26 first to lift or elevate the cam assembly and associated parts including the plug 12, and upon continued rotation the cam member 28 then acts through ball bearings 33 and cam surface 25 to retract or lower the stem and associated plug 12. Thus, the plug 12 is seated and unseated in response to a predetermined angular movement of the spindle 30 and it is to be understood that the axial movement of the plug will depend on the pitch of the cam surfaces which may be varied to give an axial movement of the order of a few thousandths of an inch in the case of a metal plug, to a quarter of an inch or more in the case of a rubber lined plug.

Figure 2:
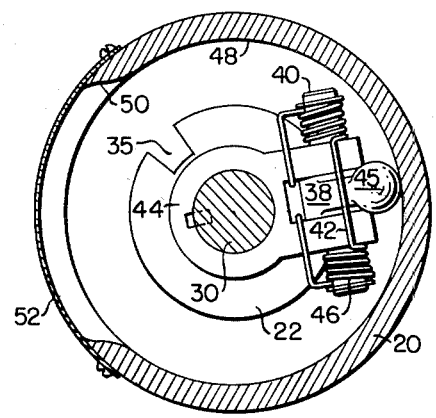
Fig. 2 is an enlarged section on the line 2—2 of Fig. 1.

The upper surface of the cam 22 is formed with a recess or notch 35 arranged to receive the depending locking finger 36 of a latch 38 which is pivotally supported on a pintle 40 carried by a laterally extending fork 42 (Fig. 2) integral with a sleeve 44 which is keyed to a spindle 30. The upper end of the latch 38 carries a head or follower 45 which is urged outwardly by a coil spring 46 mounted on the pintle 40.

The upper inner wall of housing 20 is in the form of a fixed track 48 having a dwell portion of about 270° and an intervening recess 50 of 90°, here shown as formed by a cutout portion which is covered by a shield 52. The construction and arrangement of parts are such that the spring 46 holds the follower 45 against the dwell portion of the cam track 48 until the spindle 30 and sleeve 44 are rotated to bring the follower 45 to the adjacent edge of the recess portion 50, whereupon the spring 46 swings the locking finger 36 into the slot 35 to interlock the cam assembly 21—28, as shown by the dot and dash lines of Fig. 1. Since the cam assembly and associated parts are now locked against relative rotation, further rotation of the spindle 30 rotates these parts and the associated valve stem and plug 12, it being understood that no axial movement of the stem and plug can take place because the cam assembly and associated parts are interlocked.

The rotational movement of plug 12 is limited to the 90° angle corresponding to the recess 50 by a stop 54 (Figs. 3 and 4) which is engageable with abutments 55 and 56 integral with the yoke 10. In order to prevent the plug 12 from undergoing a possible rotational drifting or creeping during axial movement, a locking member 58 is interposed between the abutments 55 and 56, the construction and arrangements of parts being such that when the plug 12 is rising the stop 54 is in engagement with one of the abutting surfaces 60 or 61, the height of which corresponds to the axial movement of the plug 12, and when the plug is unseated the stop 54 clears the abutting surfaces so that it may ride over the top surface 62 as indicated by the dot and dash lines of Fig. 4, when the plug 12 is rotated. As the stop 54 approaches the abutment 56, the cam 45 starts to ride over the beveled or tapered surface at the edge of recess 50 and by the time the stop 54 engages the abutment 56, the latch finger 36 has swung out of the slot 35, thereby unlocking the cam assembly and permitting it again to come into operation so as to effect downward axial movement of the stem 15 and plug 12, which causes the stop to be brought into position contiguous to surface 61.

Figure 3:
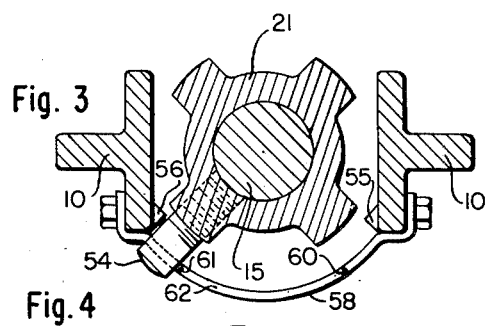
Fig. 3 is an enlarged section on the line 3—3 of Fig. 1.
Figure 4:
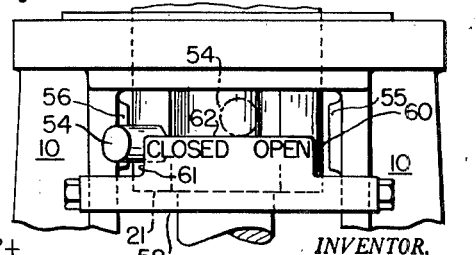
Fig. 4 is an elevation of the parts shown in Fig. 3.

The rotation of the stem 15 and plug 12 is thus limited to a 90° movement by the abutments 55 and 56, and sequential axial movement of these parts is due to the locking member 58 which may be appropriately marked to indicate the position of the plug, as shown in Figs. 3 and 4. Although the primary function of the stop 54 is to limit the movement of the plug 12, it will be noted that it also provides a finger indicating the exact angular position of the plug in the valve cavity. The spindle 30 may be operated by any suitable actuating lever, here shown as a handle or handwheel 65 fixed to the reduced upper end of the spindle 30.

Figure 5:
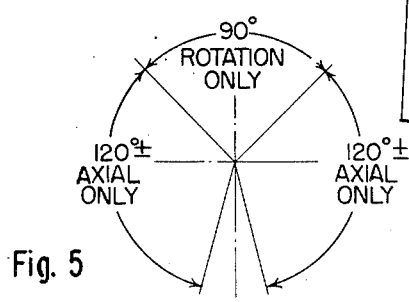
Fig. 5 is a diagram indicating the movements of the valve member for a complete operating cycle or movement of the handle or actuator.

A summary of the operation of the valve is as follows:

Assuming that the parts are in the position shown by the full lines of Figs. 1 to 4 with the plug closed and seated, rotation of the handwheel 65 in a counter-clockwise direction through an angle of approximately 120° first acts through cam member 28 and the upper cam surface 26 to lift or unseat the plug 12 and then to disengage stop 54 from abutment 61, as indicated by Fig. 5. Further rotation of the handwheel through an angle of 90° causes the locking finger 36 to interlock the cam assembly 21—28, thus arresting further axial movement and causing a 90° rotational movement of the plug 12 to open position, whereupon the stop 54 is swung against the abutment 55. Continued rotation of the handwheel 65 through an angle of approximately 120° disengages the locking finger 36 from slot 35, thus permitting the cam member 28 to act on the cam surface 25 to effect a lowering or reseating of the plug 12 while maintaining the engagement of stop 54 with abutment 55. Thus, rotation of the handwheel 65 through an angle of approximately 330° is effective first to lift or unseat the plug 12, then rotate it 90°, and finally lower or reseat it in open position, as indicated in Fig. 5; and movement of the handwheel in a clockwise direction is effective to reverse the above described operation, viz., the sequential unseating, 90° rotation and reseating of plug 12.

While I have shown and described one desirable embodiment of the invention it is to be understood that this disclosure is for the purpose of illustration and that various changes and modifications may be made without departing from the spirit and scope of the invention as set forth in the appended claims.

I claim:

1. In a plug valve of the type having a valve member mounted on a stem for axial and rotary movements and a rotary operating member, actuating mechanism connecting the operating and valve members comprising a rotary spindle coaxial with said stem and connected to said operating member, cooperating cam elements carried by the upper end of said stem and the lower end of said spindle and arranged so that a predetermined rotary movement of said operating member is effective first to move said stem axially in one direction and then to move said stem axially in the opposite direction, and interengageable means carried by said spindle and stem for interlocking said spindle and cam elements so that they rotate as a unit during a predetermined angular movement of said operating member, whereby said predetermined rotary movement of said operating member first moves said stem axially in one direction, then rotates said stem through a predetermined angle, and finally moves said stem axially in the opposite direction.

2. In a plug valve of the type having a valve member mounted on a stem for axial and rotary movements and a rotary operating member, actuating mechanism connecting the operating and valve members comprising a rotary spindle coaxial with said stem and connected to said operating member, cooperating cam elements carried by the upper end of said stem and the lower end of said spindle and arranged so that a predetermined rotary movement of said operating member is effective first to move said stem axially in one direction and then to move said stem axially in the opposite direction, one of said cam elements having a locking recess, a latch member carried by said spindle and having a locking finger arranged to project into said recess so as to lock said spindle and cam elements together so that they rotate as a unit when said spindle has rotated through a predetermined angle, and latch operating means effective to project said finger into said recess so that said predetermined rotary movement of said operating member first moves said stem axially in one direction, then rotates said stem through a predetermined angle, and finally moves said stem axially in the opposite direction.

3. In a plug valve of the type having a valve member mounted on a stem for axial and rotary movements and a rotary operating member, actuating mechanism connecting the operating and valve members comprising a rotary spindle coaxial with said stem and connected to said operating member, cooperating cam elements carried by the upper end of said stem and the lower end of said spindle and arranged so that a predetermined rotary movement of said operating member is effective first to move said stem axially in one direction and then to move said stem axially in the opposite direction, one of said cam elements having a locking recess, a latch member carried by said spindle, said latch member having a laterally projecting head and a depending locking finger arranged to project into said recess so as to lock said spindle and cam elements together so that they rotate as a unit when said spindle has been rotated through a predetermined angle, and a fixed track circumposed about said spindle and engageable by said head to project said finger into said recess so that said predetermined rotary movement of said operating handle first moves said stem axially in one direction, then rotates said stem through a predetermined angle, and finally moves said stem axially in the opposite direction.

4. In a plug valve of the type having a valve member mounted on a stem for axial and rotary movements and a rotary operating member, actuating mechanism connecting the operating and valve members comprising a rotary spindle coaxial with said stem and connected to said operating member, a cam assembly having spaced axially aligned cam surfaces, the lower part of said assembly being secured to the upper end of said stem, the lower end of said spindle projecting into said assembly and having a cam member cooperatively disposed between said cam surfaces so that a predetermined rotary movement of said operating member moves said stem axially in one direction, and then moves said stem axially in the opposite direction, and interlocking latch means carried by said spindle and cam assembly for interlocking said spindle cam assembly and cam member so that they rotate as a unit during a predetermined angular movement of said operating member, whereby said predetermined rotary movement of said operating member first moves stem axially in one direction, then rotates said stem through a predetermined angle, and finally moves said stem axially in the opposite direction.

5. In a plug valve of the type having a valve member mounted on a stem for axial and rotary movements and a rotary operating member, actuating mechanism connecting the operating and valve members comprising a rotary spindle coaxial with said stem and connected to said operating member, a cam assembly having spaced axially aligned cam surfaces, the lower part of said assembly being secured to the upper end of said stem, and the upper part of said assembly having a locking recess, the lower end of said spindle projecting into said assembly and having a cam member cooperatively disposed between said cam surfaces so that a predetermined rotary movement of said operating member is effective to move said stem axially in one direction and then to move said stem axially in the opposite direction, a latch member carried by said spindle and having a locking finger arranged to project into said recess so as to lock said spindle cam assembly and cam member together so that they rotate as a unit when said spindle has been rotated through a predetermined angle, and latch operating means effective to project said finger into said recess so that said predetermined rotary movement of said operating member first moves said stem axially in one direction, then rotates said stem through a predetermined angle and finally moves said stem axially in the opposite direction.

6. In a plug valve of the type having a valve member mounted on a stem for axial and rotary movements and a rotary operating member, actuating mechanism connecting the operating and valve members comprising a rotary spindle coaxial with said stem and connected to said operating member, a cam assembly having spaced axially aligned cam surfaces, the lower part of said assembly being secured to the upper end of said stem and the upper part of said assembly having a locking recess, the lower end of said spindle projecting into said assembly and having a cam member cooperatively disposed between said cam surfaces so that a predetermined rotary movement of said operating member is effective to move said stem axially in one direction and then to move said stem axially in the opposite direction, a latch member carried by said spindle, said latch member having a laterally projecting head and a depending locking finger arranged to project into said recess to lock said spindle cam assembly and cam member together so that they rotate as a unit when said spindle has been rotated through a predetermined angle, and a fixed track circumposed about said spindle and engageable by said head to project said finger into said recess so that said predetermined rotary movement of said operating handle first moves said stem axially in one direction, then rotates said stem through a predetermined angle, and finally moves said stem axially in the opposite direction.

References Cited in the file of this patent

UNITED STATES PATENTS

| 2,052,462 | Grissett | Aug. 25, 1936 |
| 2,412,529 | Mueller | Dec. 10, 1946 |
| 2,459,682 | Carrie | Jan. 18, 1949 |
| 2,501,150 | Anderson | Mar. 21, 1950 |